United States Patent

Selbert et al.

[11] Patent Number: 4,723,816
[45] Date of Patent: Feb. 9, 1988

[54] SNAP-ON CLIP MOUNTING SYSTEM FOR LOAD BEARING FABRIC SEAT MEMBERS

[75] Inventors: Alan J. Selbert, Tecumseh; Richard E. Boggs, Ypsilanti, both of Mich.

[73] Assignee: Johnson Service Company, Milwaukee, Wis.

[21] Appl. No.: 909,988

[22] Filed: Sep. 22, 1986

[51] Int. Cl.⁴ .................................................. A47C 7/02
[52] U.S. Cl. ...................................... 297/452; 297/441; 297/DIG. 1
[58] Field of Search ...................... 297/441, 452, 457; 24/462, 335, 326, 457; 160/392, 395, 399, 402

[56] References Cited

U.S. PATENT DOCUMENTS

| | | | |
|---|---|---|---|
| 2,629,432 | 2/1953 | Hauslick | 24/462 X |
| 3,175,269 | 3/1965 | Raduns et al. | 297/452 X |
| 3,328,085 | 6/1967 | Schwartz et al. | 297/452 |
| 3,757,479 | 9/1973 | Martinez | 160/392 X |
| 3,844,612 | 10/1974 | Borggren et al. | 297/441 X |
| 4,107,826 | 8/1978 | Tysdal | 160/395 X |
| 4,189,880 | 2/1980 | Ballin | 160/392 X |
| 4,341,255 | 7/1982 | Mock | 160/392 X |
| 4,364,607 | 12/1982 | Tamburini | 297/452 |
| 4,472,862 | 9/1984 | Bloomfield et al. | 160/392 X |
| 4,603,907 | 8/1986 | Witzke | 297/452 |

FOREIGN PATENT DOCUMENTS 1286849 1/1962 France .................................. 24/462

Primary Examiner—Francis K. Zugel
Attorney, Agent, or Firm—Harness, Dickey & Pierce

[57] ABSTRACT

A vehicle seat assembly which includes a frame having side rails with upright webs and upper flanges and a load carrying fabric web mounted on and extending between the side rails wherein mounting clips are clamped to the ends of the web by barb shape clamps and then hooked over the flanges so as to maintain the web in a load carrying condition.

5 Claims, 4 Drawing Figures

SNAP-ON CLIP MOUNTING SYSTEM FOR LOAD BEARING FABRIC SEAT MEMBERS

BACKGROUND OF THE INVENTION

This invention relates generally to the field of seating and more particularly to seat assemblies for use in vehicles such as automobiles and the like. In the past, most automobile seating involved the use of foam and some type of metal springs. The primary function of the springs was to provide added structural support. During quick loading of the seat or during long-term continuous use of the seat, the seat occupant could feel the springs which thus became a source of discomfort.

More recently, seat assemblies have been developed in which the load bearing seat member is a web or sheet of material that can be tensioned and is encapsulated within a foam body so that the web and foam body coact to yieldably resist seating loads. The web or sheet is preferably a matrix of fibrous material which is attached to the frame and operates like a network of filaments, as disclosed in co-pending application Ser. No. 437,715 filed Oct. 29, 1982 and assigned to the assignee of this application.

The present invention provides improved structure for mounting load bearing webs or sheets of fabric on the seat frame. Past methods of attaching foam support systems to the frame have necessitated the sewing of mounting members or clips to opposite ends of the web, thereby necessitating substantial assembly costs. This invention is thus an improvement on the structure shown in U.S. patent application Ser. No. 556,482 filed Nov. 30, 1983, now U.S. Pat. No. 4,603,907 dated Aug. 5, 1986. It is an object of this invention, to provide web attachment structure which provides for a continuous attachment of the web to the frame to thereby take full advantage of the uniform web load carrying characteristics and can be accomplished by snap-on clips which do not require any servicing.

SUMMARY OF THE INVENTION

The vehicle seat assembly of this invention comprises a main structural frame and a pre-tensioned load-supporting web which is mounted at its ends on the frame and spreads the loads of the occupant over a larger area, thereby allowing for thinner seats without causing local pressure points. The vehicle seat frame has a cushion support portion which includes a pair of side rails having upright webs and upper flanges which extend outwardly from each other and may or may not have down-turned extensions at their outer edges. A load-carrying membrane is mounted on and extends between the side rails, the mounting being facilitates by clip mounting members which are snapped onto the ends of the web.

The mounting members are formed of a structural plastic strip which is shaped so that it is return bent upon itself in cross section. The mounting strips are secured by snap-in place locking members to opposite ends of the membrane. The open ends of the strips are then hooked over the main frame flanges so as to maintain the web in a tensioned condition. The result is a mounting of the membrane in which it is uniformly supported at its ends so that all portions of it will provide uniform resistance to seating loads. This avoids localized stress areas in both the membrane and the frame to thereby enable the membrane and the frame to be constructed of a minimum amount of material which will provide the desired seating comfort without adding to the cost and weight of the vehicle.

Further objects, features and advantages of this invention will become apparent from a consideration of the following specification when taken in connection with the appended claims and the accompanying drawing in which:

Figure 1:
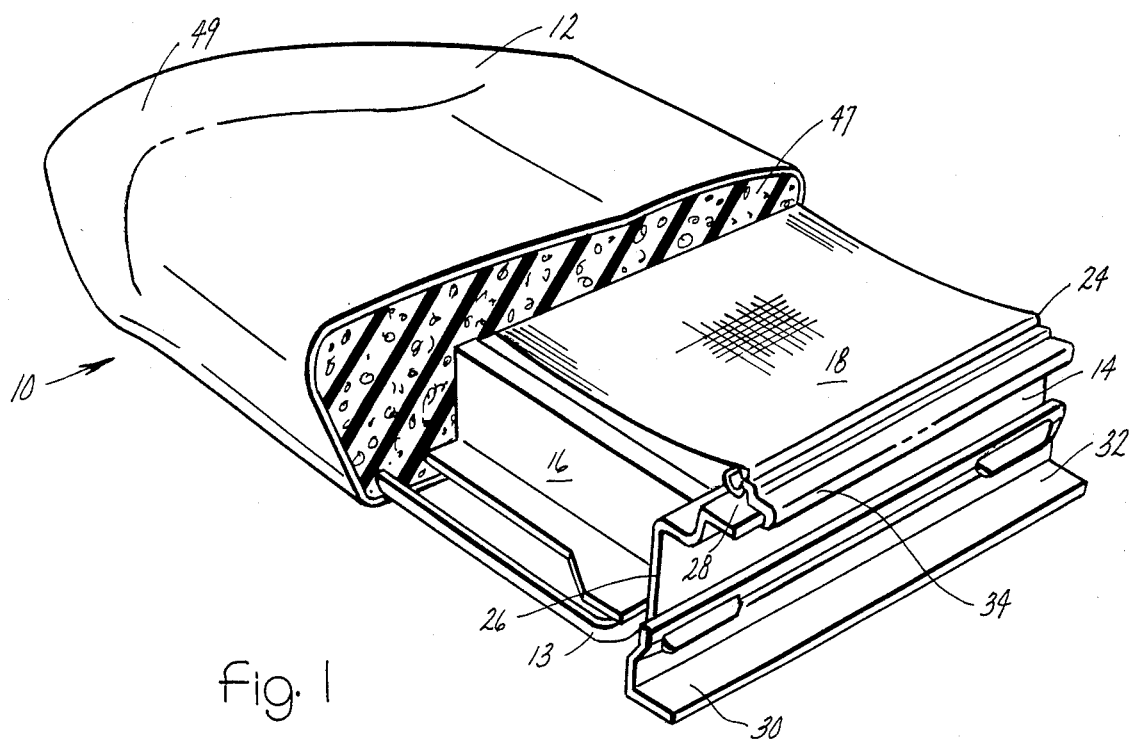
FIG. 1 is a perspective view of the seat assembly of this invention with some parts broken away and other parts shown in section for the purpose of clarity.

With reference to the drawing, the seat assembly of this invention, indicated generally at 10, is illustrated in FIG. 1 as having a cushion portion 12. The seat assembly 10 includes a main structural frame 13 having side rails 14, only one of which is shown, and a front rail 16. The assembly also includes a load supporting web or sheet 18 which extends between the rails 14 and supports the seating load of the occupant.

The web 18 can take many forms. For example, it can be of the form shown and described in co-pending application Ser. No. 437,715, which description is incorporated herein by reference, consisting essentially of a sheet or membrane of woven fibrous material having filaments extending both parallel to the side rails 14 and side-to-side between the rails 14.

The web 18 has a pair of end portions 24 that are identical and are identically mounted on the side rails 14 and, for this reason, only one end portion 24 is illustrated in FIG. 1. As shown in FIG. 1, each side rail 14 has an upright web 26 and upper and lower flanges 28 and 30, respectively, which extend in horizontally opposite directions from the web 26. The lower flange 30 is supported in a frame assembly 32 that is secured to the floor of the vehicle in which the seat 10 is mounted. The upper flange 28 extends outwardly with respect to the seat cushion portion 11 to thereby extend the load supporting surface of the web 18 in horizontal directions. As shown in FIG. 1, a continuous strip 34 of plastic material is secured to the end portion 24 of the web 18.

The strip 34 is referred to as a "J-strip" because it is of a return bent upon itself configuration so that it has a pair of generally parallel legs 38 and 40 and when these legs are positioned so that they are upright, the cross sectional shape of the strip 34 resembles the letter "J". The leg 38 is longer than the leg 40 and is secured to the web end portion 24, the leg 40 being positioned below the leg 38 at each end of the web 18.

The web 18 is secured to the J-strips 34 by locking members 41 (FIG. 2) each of which has diverging leg members 42 that terminate in inwardly directed flanges 44 that extend toward each other. The locking members 41 interfit with barb shape projections 46 on the terminal ends of the strips 34 so as to firmly clamp the edge portions 24 of the web 18 therebetween.

Each projection 46 interfits with a locking member 41 so that a shoulder 48 on the projection engages the flanges 44 to positively prevent release of the web 18 under tension.

Figure 2:
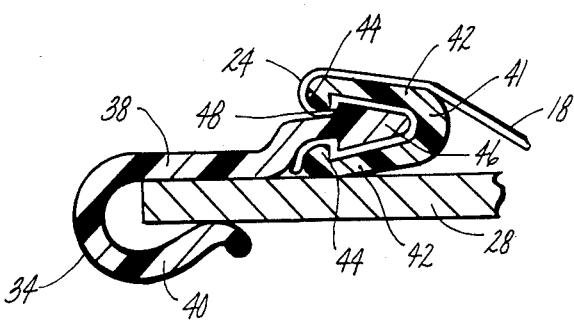
FIG. 2 is a fragmentary enlarged sectional view of a portion of the seat assembly shown in FIG. 1.

The web 18 is stretched, during assembly of the web 18 with the frame rails 14, so as to induce tension of a predetermined magnitude into the filaments of the membranes 20 which extend side-to-side. The mounting strips 34 are then hooked over the side rail flanges 28 as shown in FIG. 2 to securely mount the web 18 on the rails 14 in a position in which the pre-stretching of the web 18 is maintained.

A foam body 47 of conventional bucket seat shape is molded in place on the frame 13 so as to enclose the web 18 and the rails 14. In the illustrated seat 10, the body 42 includes side bolsters 49 of foam material that encompass the mounting strips 34 and the flanges 28. Encapsulation takes place with the web 18 in a substantially horizontal condition in which it will support and yieldably resist downwardly directed seating loads applied to the seat cushion 11. The foam in the body 47 functions to lock all of the fibers or filaments in the web 18 together to provide for the desired distribution of seating loads throughout the web 18 and avoid areas of stress concentration. The foam also functions to shrink the web 18 to further induce tension in the web 18 and insure its ability to comfortably resist seating loads. The foam in the body 47 can be of any suitable foam material such as a urethane foam of the type used and described in detail in U.S. Pat. No. 3,142,073.

Figure 3:
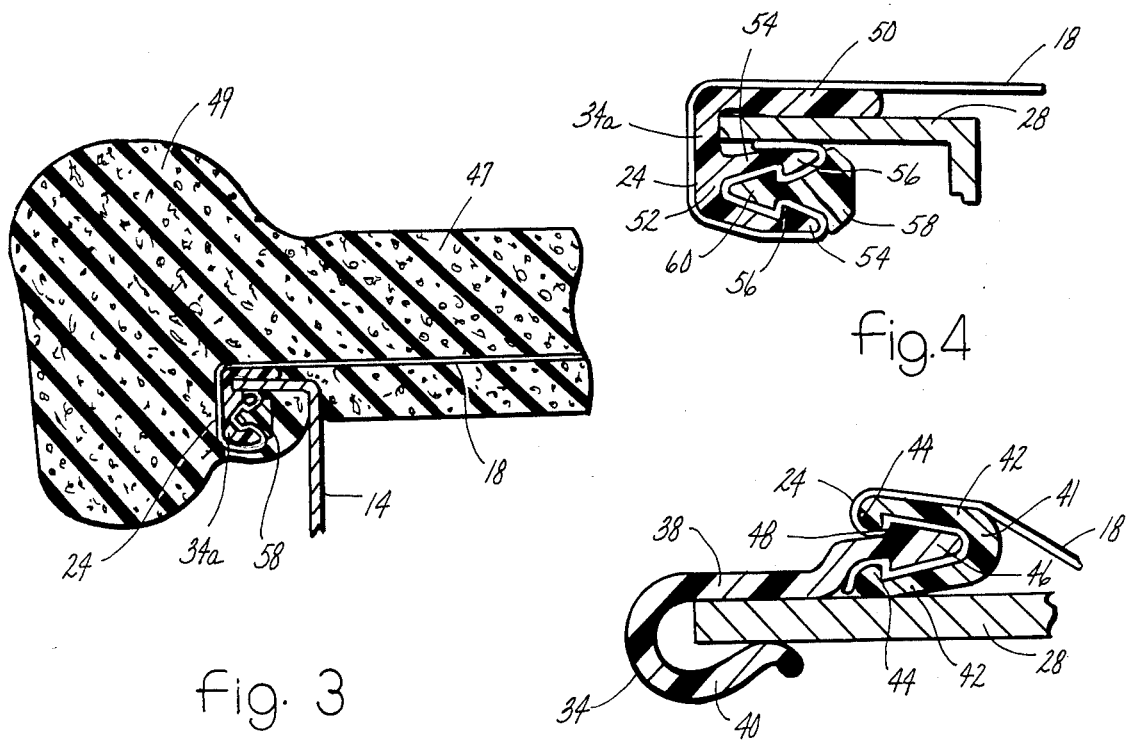
FIG. 3 is a fragmentary sectional view illustrating a modified form of the snap-on J-clip mounting member of this invention and the attachment thereof to a load bearing membrane.
Figure 4:
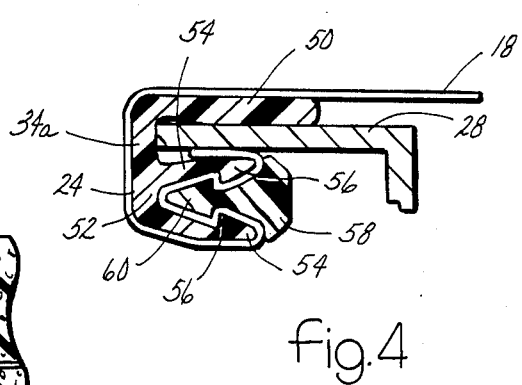
FIG. 4 is a fragmentary enlarged sectional view like FIG. 2 showing the modified form of the clip and membrane assembly shown in FIG. 3.

FIGS. 3 and 4 illustrate a modified form of mounting strip 34a and locking member 58.

The strip 34a is of return bent upon itself shape having an upper leg 50 engaged with the top side of a side rail flange 28 and a lower leg 52 engaged with the under side of the flange 28. The lower leg 52 terminates in diverging legs 54 which have inwardly directed flanges 56 at their ends which extend toward each other.

A locking member 58 has a barb shape projection 60 which is inserted between the legs 54 to a stop position behind the flanges 56 to clamp a web end portion 24 to the strip 34a. In the form of the invention shown in FIGS. 3 and 4, seating loads on the web 18 are more effectively resisted because the ends of the web are return bent upon themselves and then clamped to the mounting strip 34a.

In both forms of the invention the locking members 41 and 58 can be continuous or they can be a series of spaced individual members.

From the above description, it is seen that this invention provides a vehicle seat assembly 10 in which a foam encapsulated web 18, which can also be alternatively described as a membrane, sheet, or the like, cooperates with the mounting strips 34 and 34a and the side rail flanges 28 to provide for mounting of the web 18 on the seat frame 13 so as to effectively resist seating loads. The locking members 41 and 58 enable quick and effective attachment of the ends 24 of the web 18 to the mounting strips.

What is claimed is:

1. In a vehicle seat which includes a frame having a cushion portion, wherein said cushion portion includes a pair of side rails having upright portions and upper flanges which extend outwardly from each other, a load carrying web adapted to be mounted on and extend between said side rails, a foam body on said frame and extended upwardly from and secured to said web, mounting members for said web mounted on said upper flanges, said mounting members constituting the sole support for said web on said frame for maintaining said web in tension on said flanges, said mounting members comprising substantially continuous strips, means securing said strips to opposite edges of said web, each of said strips being of a return bent upon itself shape in cross section and being hooked over one of said flanges, the improvement wherein said means securing said strips to opposite edges of said web comprises locking members having one-way interfitting engagement with said strips and opposite edges of said web being clamped between said members and said strips, said strips and locking members being shaped so that one of them has a pair of relatively diverging leg portions which terminate at their free ends in inwardly directed flanges which extend toward each other and the other one of them has a barb shape portion insertable between said legs to a stop position behind said flanges, each of said barb shape portions having shoulders engageable with said flanges with an edge portion of said web therebetween to positively prevent release of the web under tension whereby to clamp said edge portion of said web between said strip and locking member.

2. The mounting for a load carrying web in a vehicle seat set forth in claim 1 wherein said strips are secured to said web at positions below said upper flanges.

3. The mounting for a load carrying web in a vehicle seat set forth in claim 2 wherein said barb shape portions are on said locking members.

4. The mounting for a load carrying web in a vehicle seat set forth in claim 1 wherein said strips are secured to said web at positions above said flanges.

5. The mounting for a load carrying web in a vehicle seat set forth in claim 4 wherein said barb shape portions are on said strips.

* * * * *